May 7, 1935.  G. SPATTA  2,000,573
METAL WHEEL
Filed Jan. 16, 1928

Witness
Milton Lenoir

Inventor
George Spatta,
By John L. Lawson.
Attorney

Patented May 7, 1935

2,000,573

UNITED STATES PATENT OFFICE 2,000,573

METAL WHEEL

George Spatta, Buchanan, Mich., assignor to Clark Equipment Company, Buchanan, Mich., a corporation of Michigan Application January 16, 1928, Serial No. 246,926

11 Claims. (Cl. 301—6)

My invention relates to pressed steel wheels and has particularly to do with such wheels in which the intermediate portion of the wheel which joins the hub with the felloe is made up of complementary members secured together, such members being first fashioned to proper shape by a stamping operation. Preferably such intermediate portion is in the form of a spider the inner portion of which is disc like while its outer portion is in the form of hollow spokes circular or elliptical in cross-section. A felloe band is mounted upon the periphery of the intermediate portion and is secured thereto in any appropriate way, as by welding, or by projecting portions of the felloe band inwardly into the outer ends of the spokes, as shown and described in the patent to Edmund C. Mogford and Frederick W. Burger, No. 1,691,163, issued November 13, 1928.

The subject-matter of my present invention is the provision of a wheel of the type referred to with a hub arranged to receive the usual axle spindle, in such manner that the hub serves to support and reenforce the intermediate portion of the wheel; also the provision of a brake drum as a part of the hub structure, the whole being so arranged that the parts when assembled form an inseparable wheel, hub and brake drum.

In the accompanying drawing in which I have shown my invention embodied in a wheel of the spoke type,—

Figure 1:
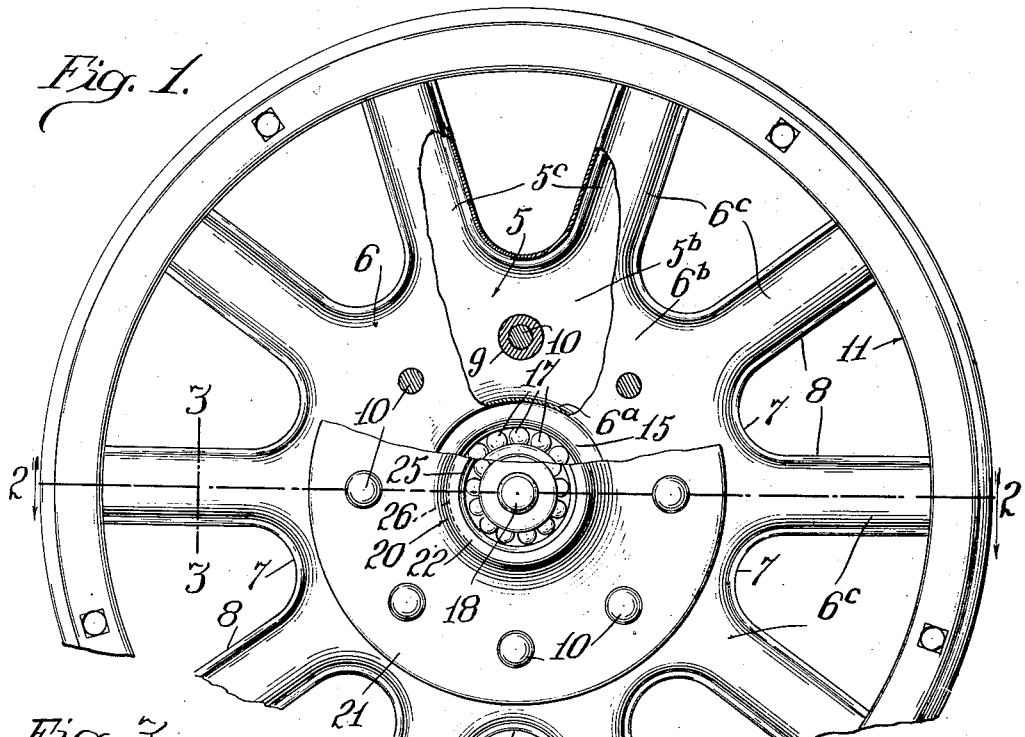
Fig. 1 is a side elevation of the wheel, partly broken away and partly in section.
Figure 3:
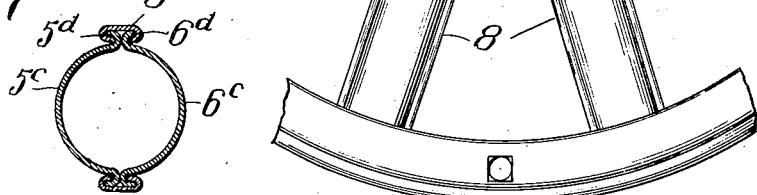
Fig. 3 is a cross-section of one of the spokes showing the manner in which the spider is formed.
Figure 2:
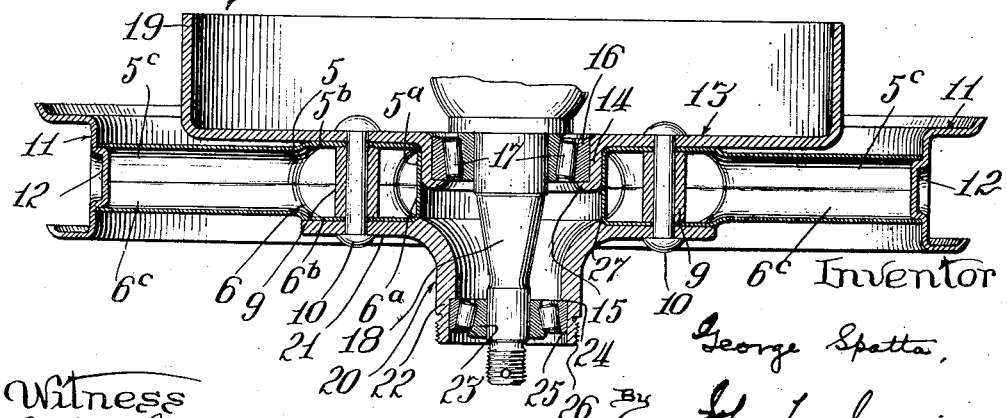
Fig. 2 is a horizontal section on the line 2—2 of Fig. 1.

Referring to the drawing, 5, 6 indicate the two complementary members that constitute the intermediate portion of the wheel. These two members are alike so that the same die may be used for stamping both. In the illustrated construction each of said members comprises an annular disc-like inner portion $5^b$, $6^b$ having at its inner margin an inturned flange $5^a$, $6^a$, that is disposed at right angles to such disc portion, as best shown in Fig. 2. The outer surface of each of the portions $5^b$, $6^b$ is flattened, and extending radially from such flattened inner portion is a substantially semicylindrical spoke member $5^c$, $6^c$. As shown in Fig. 3, the marginal portions of the parts $5^c$, $6^c$ are rolled outwardly to form longitudinal flanges $5^d$, $6^d$, and as shown at 7 in Fig. 1 these flanges are continuous between adjoining spoke members; that is to say, the flange $5^d$, for example, at the right hand margin of one spoke member is continuous with the flange $5^d$ at the left hand side of the adjacent spoke member. The arrangement is such that when the two parts of the spider are assembled the edges of the flanges $5^a$, $6^a$ abut against each other, and the rounded marginal portions of the spoke members also abut against each other in the manner shown in Fig. 3. The flanges $5^d$, $6^d$ are thus adapted to receive channeled locking strips 8 that engage over the flanges $5^d$, $6^d$ to form what is commonly known as a tinner's joint. The channeled locking strips 8, which are U-shaped to conform to the shape of the spaces between consecutive spokes, are clamped tightly in place, and may if desired be further secured by welding. When the parts are thus assembled the result is a hollow spider having a disc-like central portion with hollow spokes radiating therefrom, and with a concentric annular band formed by the flanges $5^a$, $6^a$ at the center. The inner portion of the spider is provided at suitable intervals with spacing sleeves 9 placed between the flattened portions $5^b$, $6^b$ and secured by rivets 10, which, as will be hereinafter described serve also to secure the parts of the hub to the spider.

Figure 4:
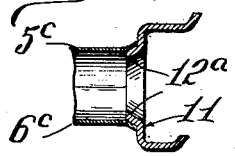
Fig. 4 is a sectional detail of the outer end of one of the spokes and the felloe band, illustrating a modified way of securing the felloe band on the spider.

Mounted upon the peripheral portion of the spider is a felloe band 11, which is best made in the form of a continuous band adapted to fit tightly upon the outer ends of the spokes and to be secured thereto in any suitable way. This may be accomplished by indenting the band over the outer ends of the spokes to form projections 12 that extend thereinto. These projections may if desired be formed without perforating the felloe band so that the ends of the spokes are closed as shown in Fig. 2, or if desired the felloe band may be perforated to form inwardly projecting annular flanges $12^a$ that project into the outer ends of the spokes, as shown in Fig. 4. With either of these methods it is unnecessary to weld the felloe band on the spider, but the parts may, of course, be welded if desired, and such welding may be used without the formation of the indentations, if preferred.

The hub of the wheel is made up of two hub elements at opposite sides of the wheel and arranged to overlap the inner portions of the intermediate members, respectively, and to be secured firmly thereto, the inner hub element, in the best embodiment of my invention, serving also as a brake drum. As best shown in Fig. 2, the inner hub element is in the form of a disc 13 that overlaps the outer flat surface 5ᵇ of the member 5 and is provided at its inner margin with a flange 14 that extends axially of the wheel and fits closely against the flange 5ᵃ so as to form a support for the intermediate member of the wheel. The flange 14 may be extended far enough to underlie the flange 6ᵃ also, if desired, but that is not essential. At its inner margin the flange 14 is provided with an annular shoulder 15 that extends toward the axis of the wheel and forms a seat for the inner margin of the outer race 16 of a roller bearing indicated as an entirety by the reference numeral 17. This roller bearing is of conventional design and cooperates with an outer roller bearing, to be hereinafter described, in supporting an axle spindle 18. The hub element 13 is provided at its outer margin with an outwardly extending annular flange 19 that provides a braking surface so that the element 13 as a whole constitutes a brake drum.

The outer hub element, indicated at 20 in Fig. 2, comprises a disc portion 21 that overlaps the flat surface 6ᵇ of the spider member 6, and an outwardly projecting sleeve portion 22 adapted to receive a roller bearing 23 coaxial with the roller bearing 17. To this end the sleeve portion 22 is provided with a shoulder 24 against which the outer race 25 of the bearing 23 is seated. The sleeve portion 22 is preferably screw-threaded as shown at 26 to receive a hub cap. As shown in Fig. 2, the outer hub portion 20 is provided with an annular shoulder 27 against which the inner portion of the spider member 6 bears, thereby facilitating the positioning of the outer hub member in assembling the parts and also preventing their displacement.

As shown in Fig. 2, the two hub elements are firmly secured together and to the intermediate portion of the wheel by the rivets 10, which extend through said hub elements and also through the spider members and the spacing sleeves 9, so that the parts are all drawn tightly together to form an inseparable wheel, hub and brake drum. The spacing sleeves 9 must, of course, be put in place before the parts of the spider are joined together, and in practice I prefer to first complete the assembly of the parts of the spider, including the spacing sleeves, and then apply the felloe band thereto, thereby forming a self contained hubless wheel, to which the parts of the hub may then conveniently be applied.

It will be noted that in my improved wheel the brake drum, or inner element of the hub, carries the inner wheel bearing, and this constitutes half of the hub, and requires no more material than would be needed for the usual type of brake drum which slides over a cast hub and in which the center portion is cut away and scrapped. The outer hub element is another simple stamping which serves to carry the outer bearing, and when properly alined and riveted to the drum and spider completes the wheel hub, so that the usual forged or cast hub is completely eliminated. This construction also eliminates the nuts required in the conventional assembly. By my improved construction the weight of the hub is greatly reduced as compared with hubs of conventional design, the saving in weight being approximately fifty per cent. For example, a front hub of conventional design weighs approximately six and one-half pounds, whereas a built up hub of my improved design should not exceed three and one-quarter pounds in weight, making for a corresponding reduction in the weight of the wheel. A further advantage of my improved construction is that the wheel possesses great rigidity, so that after its component parts have been riveted together, the subsequent grinding of the braking surface on the brake drum and the bearing cups on the hub, will produce a wheel that is absolutely concentric and true and will remain so during its life.

As has been stated, my invention may be embodied either in a wheel of the spoke type or in one of the disc type, although the spoke type is preferred. It should be understood, therefore, that the term spider as used in the specification and claims is intended to designate the intermediate portion of a wheel of either type. It should be understood also that while I prefer to have the complementary members composing the intermediate portion of the wheel alike in all respects, that is not essential as it is sufficient if they are so designed that they cooperate to form the intermediate portion of the wheel.

What I claim as my invention and desire to secure by Letters Patent, is—

1. A metal wheel comprising a spider having a nave portion and spokes integral therewith and radiating therefrom, a hub composed of inner and outer hub elements overlapping the opposite sides of the nave and secured thereto, one of said hub elements having, integral therewith, a centrally located ring means projecting axially into the spider for supporting the same, and inner and outer bearings mounted, respectively, in said axially projecting ring means of one of the hub elements and in the other hub element.

2. A metal wheel comprising a unitary spider having a nave portion and spokes integral therewith and radiating therefrom, a hub composed of inner and outer hub elements overlapping the opposite sides of the nave and secured thereto, one of said hub elements comprising a braking surface, means integral with one of said hub elements and projecting axially into and fitting closely within the central portion of the spider for supporting the same, and means integral with the other hub element and projecting out of the spider for supporting the same, said inward and outward projecting means including bearings.

3. A metal wheel comprising a unitary hollow spider, a hub composed of inner and outer hub elements overlapping the opposite sides of the spider and secured thereto by means extending through the spider and drawing the hub elements towards one another, means within the spider adjacent said first means for holding the walls of the spider against collapse under the drawing force of said first means, one of said hub elements having means projecting axially into the spider for supporting the same and the other hub element having means projecting axially out of the spider for also supporting the same, and inner and outer bearings mounted in the respective axial projections of said hub elements.

4. A metal wheel comprising a unitary hollow spider, a hub composed of inner and outer hub elements overlapping the opposite sides of the spider and secured thereto by means extending through the spider and drawing the hub elements towards one another, means within the spider adjacent said first means for holding the walls of the spider against collapse under the drawing force of said first means, one of said hub elements having bearing receiving means projecting axially into the spider and bearing against the same for supporting the same, a brake band formed integrally with one of the hub elements, and inner and outer bearings mounted, respectively, in said hub elements.

5. A hollow wheel having a hub structure comprising a pair of plate members secured to the opposite sides of the wheel by means extending through the wheel and through both plate members, thus serving to secure both plate members together and to the wheel, said means including means within the nave portion of the wheel for holding the adjacent wheel parts against collapse, one of the plate members including a braking surface, said one plate member having an integral portion thereof extending axially of the wheel into the body of the wheel, a bearing formed on one surface of the axially extending portion, the opposite surface of this portion fitting closely within the wheel and constituting a support for a portion of the wheel, said other plate member having a central generally cylindrical portion extending axially outwardly of the body of the wheel.

6. A hub structure for a wheel, comprising a pair of hub plates spaced apart by the nave portion of the wheel and secured together and to the nave portion of the wheel by means extending through the hub plates and through the nave portion of the wheel, one of said hub plates including a central portion that extends axially into a central opening in the nave of the wheel and fits closely therein for supporting the wheel, a bearing for the wheel mounted in said axially extending portion, said other hub plate having a portion extending outward axially of the nave of the wheel and having a bearing on the inner periphery of said axially extending portion.

7. A wheel hub structure comprising an inner hub element having a disc portion that bears against the outer surface of a wheel and is provided with an axially disposed annular flange at its inner margin that fits closely within and bears against the inner periphery of an opening in the center of a wheel structure, an outer hub element that bears against the outer surface at the opposite side of the wheel structure and is provided with an axially disposed annular flange at its inner margin and extending outward of the wheel, bearings for said wheel mounted respectively in said flanges, and means extending through the hub elements and the wheel structure for securing the hub elements together and to the wheel structure.

8. A wheel hub structure comprising an inner hub element having a disc portion that bears against the outer surface of a wheel and is provided with an axially disposed annular flange at its inner margin that fits closely within and bears against the inner periphery of an opening in the center of a wheel structure, an outer hub element that bears against the outer surface at the opposite side of the wheel structure and is provided with an axially disposed annular flange at its inner margin and extending outward of the wheel, bearings for said wheel mounted respectively in said flanges, and means extending through the hub elements and the wheel structure for securing the hub elements together and to the wheel structure, one of said hub elements being provided with a braking surface.

9. A metal wheel comprising a hollow spider having a central body portion and spokes integral therewith and radiating outwardly thereof, said body portion having a centrally located opening defined by a cylindrical wall comprising an integral part of said body portion, a hub plate on one side of said body portion and having a hollow cylindrical bearing supporting portion extending into and fitting tightly within said cylindrical wall, said hub plate having another cylindrical portion extending outwardly of the spider and comprising a brake drum, a second hub plate on the other side of the body of the spider and having a bearing supporting portion coaxial with the first mentioned bearing supporting portion and extending outwardly of the body of the spider an amount in excess of the amount of inward extension of the first mentioned bearing support, means securing the two hub plates together and to the spider and serving to compress the spider, reenforcing means within the spider adjacent the securing means for holding the spider against collapse at the securing means, and bearings in said two bearing supports and spaced apart an amount greater than the thickness of the spider.

10. A wheel including a body portion and a pair of separate hub plates secured to the opposite sides of the body portion by securing means extending from one hub plate through the body portion to the other hub plate, one of said hub plates including a central cylindrical portion extending axially into the body portion of the wheel and, at its outer periphery, supporting the body portion of the wheel, said supporting cylindrical portion having a bearing formed at its inner periphery and located axially within the body portion of the wheel, said other hub plate having an axially outward extending portion including a bearing aligned with the first mentioned bearing.

11. In a wheel for motor vehicles, a drum member formed with a radially extended web wall and a central transversely-outwardly extended cylindrical flange defining a hub bore, an axle shaft bearing in said bore, said cylindrical flange being formed with a portion adapted to engage said bearing and prevent outward transverse displacement of said bearing, a separate outboard hub member formed with a radially extended flange and a complementary central transversely-outwardly extended cylindrical flange defining an extension of said hub bore, another axle shaft bearing in said extension bore, and a wheel member clamped between the wall of said drum and the radially-extended flange of said outboard hub member, the walls of said drum member and said outboard member being of substantially uniform thickness throughout to facilitate shaping by a stamping, pressing or rolling operation.

GEORGE SPATTA.